UNITED STATES PATENT OFFICE.

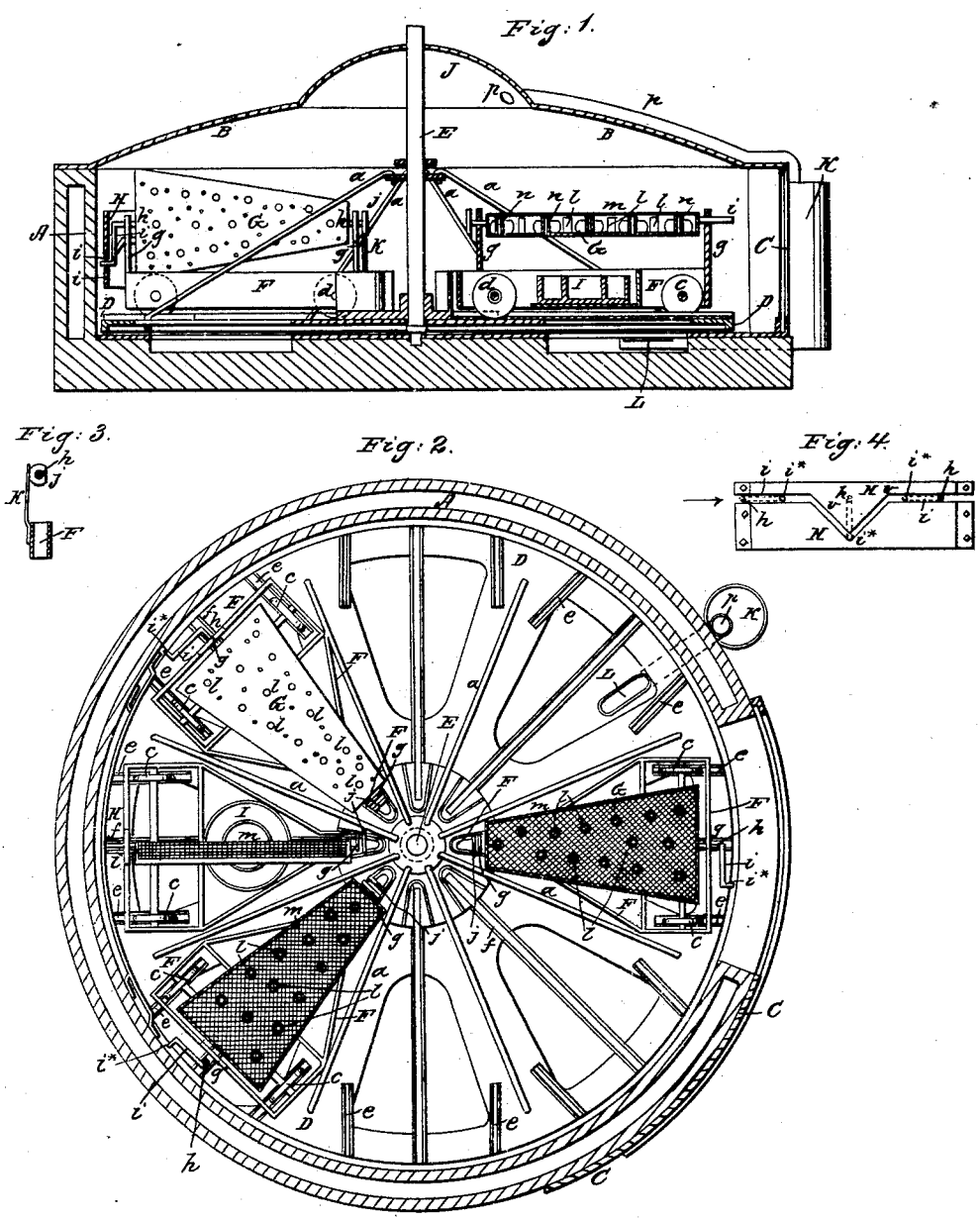

JOHN CHILCOTT, OF BROOKLYN, NEW YORK.

BAKER'S OVEN.

Specification of Letters Patent No. 17,495, dated June 9, 1857.

*To all whom it may concern:*

Be it known that I, JOHN CHILCOTT, of the city of Brooklyn, in the county of Kings and State of New York, have invented certain new and useful Improvements in Bakers' Ovens; and I do hereby declare that the following is a full, clear, and exact description of the same, reference being had to the accompanying drawings, forming part of this specification, in which—

Figure 1, is a vertical central section of an oven with my inprovements. Fig. 2, is a plan of the same with the roof removed. Figs. 3 and 4, are detail views that will be presently explained.

Similar letters of reference indicate corresponding parts in the several figures.

My invention consists in furnishing the cars which are employed to carry bread into ovens and support it during the baking operation, each with a pan or tray hung upon a horizontal axis, so as to carry the bread and be capable of being inverted with the bread in it when the baking operation is partly completed, and in turning over the said pans or trays at a proper stage of the baking process by suitable mechanical agency within the oven, for the purpose of causing the tops and bottoms of the loaves to be baked uniformly.

To enable others to make and use my invention, I will proceed to describe its construction and operation.

A, is the outer upright wall of the oven which is of circular form.

B, is the roof.

C, is a door which is fitted to slide sidewise to open and close the oven, serving both to admit the bread to and allow its withdrawal from the oven.

D, is the rotating table, which is made of wrought or cast iron, of circular form of nearly the full size of the interior of the oven, and occupies a position near the bottom of the oven, said table being made with many apertures in it for the circulation of the heat through the oven.

E, is an upright shaft to which the table D, is secured fitted to suitable bearings in the bottom and upper part of the oven. The table is stayed from the upper part of the shaft E, by wrought iron stays *a, a*.

F, F, are the cars on which the bread is run into and out from the oven made of wrought or cast iron and each mounted on two wheels *c, c*, and a third wheel *d*, and running on a track composed of three rails *e, e, f*, the central rail *f*, of each of the whole series of tracks being radial to the center of the oven and of the rotating table and the outer rails *e, e*, being parallel to the central one *f*. As many cars as the table will hold are used, though a smaller number are shown in the drawing to leave the table exposed to view. Each car has a standard *g* at its inner end and a similar one at its outer end to constitute the supports for the pans G, G, in which the bread is baked. These pans are made of wrought or cast iron and provided with a journal *h*, at each end, said journals fitting to bearings in the standards *g, g*, and the journal at the outer end of each is furnished with a crank *i*, by the aid of which the pan is turned over when necessary and that at the inner end is furnished with a stop wheel *j*, having two flat and parallel sides, the said wheel being acted upon by a spring *k*, attached to the car to retain the pan in a horizontal position. The form of the stop-wheel and spring is illustrated in Fig. 3, which is a back view. When either flat side of the wheel is turned by the spring the pan is in a horizontal position one side of the wheel holding it with its face upward and the other side bottom upward. The bottom of the pans are perforated in a suitable manner to allow the hot air to circulate through them between the loaves and a number of open tubes *l, l*, corresponding with the number of loaves to be baked in it, is attached to the bottom of each pan, the said tubes being for the purpose of passing through the centers of the loaves which I propose to make with holes through their centers to insure a more thorough baking, as shown in Fig. 1, where *n, n*, are loaves. By the arrangement of tubes the loaves are also kept in place while the pans are being turned over.

The covers of the pans, indicated by *m, m*, are represented as being made of wire work, but they may be made of perforated sheet metal.

H, is a plate of metal attached to the interior of the wall of the oven opposite to the door and containing a groove *v*, the form of which is shown in Fig. 4, which is a face view of the plate H, the said groove being for the purpose of acting upon the cranks *i*, on the journals of the bread pans to invert the said pans. The horizontal portions, near the ends of the groove *v*, stand at such an elevation that the wrists $i^*$, of the cranks $i$, when the said cranks stand in a horizontal position, as they always do when their respective pans are horizontal, will pass freely along the said portions of the said groove as the table rotates with the cars on it, but the central portion of the groove is of such an angular or V-form that the crank-pins in being caused to pass along it by the rotation of the table will cause the pans to be inverted. The action produced upon the cranks in passing through the groove is illustrated in Fig. 4, where one of the cranks is shown in red color in three positions, viz, the first with the wrist entering the groove at the left hand end, next with the wrist at the bottom of the V-shaped part in which position the crank has made a quarter revolution, and lastly with the wrist beyond the V-shaped part of the groove in arriving at which position the crank has made half a revolution and turned the pan upside down. In Fig. 2, one of the cars is shown in the act of turning over and another as having been turned over, the direction of the rotation of the table being as indicated by the arrow shown upon it. When the pan is turned over, the weight of the bread is upon the cover, therefore, some suitable means of securing the cover should be provided.

I, I, are the vessels placed upon the cars below the pans G, G, to contain the liquid to be evaporated to impregnate the bread.

J, is a dome in the center of the roof of the oven with a pipe $p$, leading from it down the exterior of the oven and through a condensing vessel K, that is filled with water, and from thence to a pan L, below the rotating table said pipe serving to convey the vapors evolved from the bread in the baking process from the oven, condense them and return them to the bottom of the oven to be re-evaporated for the impregnation of the bread with the properties of which it is partly deprived in the baking process in common ovens.

The rotating table may have its motion imparted to it by any suitable means. The door of the oven is intended to be opened and closed by some mechanical contrivance whose operation is properly timed to open it when a car is brought opposite to it by the rotation of the table, to allow the car of baked bread to be run out and a car of unbaked bread to be run in, suitable tracks being provided for these cars to run upon outside of the oven.

To facilitate the introduction and withdrawal of the bread the rotary motion of the table should be intermittent, causing it to stop every time a track arrives opposite the door, long enough to allow one car to be run out and another to be run in. The speed of the rotation should be such that the time occupied by a single rotation will be just sufficient to complete the baking process. The cars may be run in and out by some mechanical contrivances having their movements properly regulated.

The oven may be heated either by hot air or steam. I have not shown the fire place or flues or other passages or pipes by which the heat is to be supplied, as these may be varied in their arrangement to a very considerable extent. Instead of introducing the unbaked bread and withdrawing the baked bread at one door separate doors may be used.

Instead of making the table rotate on a central shaft it may be mounted upon wheels to run upon circular tracks and in that case the central portion may be entirely omitted making it of the form of a ring, but this construction involves no change in the mode of operation of the oven from what has been hereinbefore described.

I do not claim to be the original inventor of a continuously-operating oven, as I am aware that endless chains have been employed in ovens to convey the bread from one part, where it is received, unbaked, to another part, from whence it is discharged after having been baked during its travel from one part to the other, nor do I claim generally the employment within an oven of a horizontal rotating table, as I am aware that small ovens have been provided with such tables to turn a loaf or other article placed upon it, from time to time during the baking process, to prevent the scorching of one side of the loaf or article and the imperfect baking of another side thereof; but

What I claim as my invention and desire to secure by Letters Patent, is—

Providing each car by which the bread is conveyed to and from the oven with a pan or tray that is hung upon journals and is overturned at a suitable stage in the baking process by the automatic mechanical agency herein described for the purpose of inverting the position of the bread and thus causing the bread to be baked more uniformly.

JOHN CHILCOTT.

Witnesses:
O. D. MUNN,
J. F. BUCKLEY.